Patented Dec. 11, 1951

2,578,526

UNITED STATES PATENT OFFICE 2,578,526

PYRROLIDINE COMPOUNDS AND METHOD FOR PREPARING SAME

George Lyman Evans, Wilmington, Del., assignor to E. I. du Pont de Nemours & Company, Wilmington, Del., a corporation of Delaware No Drawing. Application December 16, 1948, Serial No. 65,743

16 Claims. (Cl. 260—326.3)

This invention relates to organic chemical compounds and more particularly to pyrrolidine compounds.

This invention has as an object a new class of chemical compounds which may be described as bis(oxopyrrolidineacetic acids). Further objects reside in methods for preparing these compounds. Other objects will appear hereinafter.

I have discovered that bis(5-oxo-2-pyrrolidineacetic acids) and their derivatives, wherein the two pyrrolidine nuclei are joined in the 1-1'-position, either directly or through a divalent organic radical, are obtained by heating to reaction temperature one molar proportion of a diprimary diamine with two molar proportions of a carboxylic acid having a chain of four carbon atoms which joins the carboxyl carbon to an activating radical defined more particularly below and exemplified by such groups as carboxyl, carbamyl or carbalkoxy, and which contains as the only carbon-to-carbon unsaturation one ethylenic double bond in the beta- or gamma position relative to the first-mentioned carboxyl group, the carbon atoms in said chain having their valences satisfied only by members selected from the group consisting of hydrogen and hydrocarbon radicals.

These monounsaturated carboxylic acids may be represented by the formula AR³COOH where R³ consists of a chain of four carbon atoms containing as the only carbon-to-carbon unsaturation a single ethylenic double bond located in the beta or gamma position relative to the carboxyl. These acids are represented by the two formulas

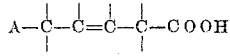

and

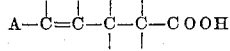

In these formulas A is carboxyl, or a neutral group which upon hydrolysis is converted to a carboxyl group with the formation of no additional acidic products and the unfilled valences of the carbon atoms in the chain joining the carboxyl group to the activating group are filled by hydrogen or low molecular weight aliphatic hydrocarbon radicals. Examples of such groups are the carboxyl group (—COOH), the carbamyl group (—CONH₂), the carbonamide groups (—CONHR) and (—CONRR'), wherein R and R' may be aliphatic, aromatic or cycloaliphatic hydrocarbon, substituted or unsubstituted, a carboxylic acid ester group (—COOR, where R is as defined above), or a nitrile group (—CN).

In the diprimary diamines used in the practice of this invention the amino groups can be joined to each other directly as in hydrazine, in which case the two pyrrolidine nuclei of the resulting compound will be directly joined, or the amino groups of the diprimary diamine can be joined by a substituted or unsubstituted divalent aliphatic or cycloaliphatic radical of from 1 to 15 carbon atoms in which case the two pyrrolidine nuclei will be similarly joined.

The bis(5-oxo-2-pyrrolidineacetic acids) and their derivatives formed in this manner, as contrasted to the polymeric products (e. g., polyamides) obtained by reacting in substantially chemically equivalent proportions a diamine and a dicarboxylic acid containing ethylenic unsaturation, are monomeric products which may be represented by the formula

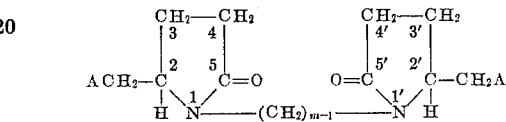

wherein $m$ is an integer of from 1 to 16, and preferably of from 1 to 7, and A is the carboxyl or neutral group previously referred to. For ease in preparation the preferred compounds are those in which A in the above formula is one of the previously mentioned —COOH, —CONH₂, —CONHR, —CONRR', —COOR or CN groups.

The present process can also be carried out by first forming the salt of the diprimary diamine and the carboxylic acid of the above described type being used in the above mentioned molecular proportions (i. e., one mole proportion of the diamine to two mole proportions of the acid), isolating and purifying the salt, if desired, and subsequently carrying out the cyclization reaction by direct pyrolysis of the salt.

The following examples in which the parts given are by weight, further illustrates the process and the porducts of this invention:

EXAMPLE I

Preparation of 1,1'-bis(5-oxo-2-pyrrolidineacetic acid)

To a nearly boiling solution of 288 parts of betahydromuconic acid in 790 parts of absolute ethanol is added with stirring and occasional cooling in an ice bath sufficient to prevent the ethanol from boiling, a cold (approx. 10° C.) solution of 50 parts of the monohydrate of hydrazine in 79 parts of absolute ethanol. The resulting slurry is cooled to about 15° C. and the crystalline precipitate removed by filtration. The filtrate is concentrated to a thick slurry by distillation under reduced pressure and the resulting crystalline material removed by filtration and combined with the previously obtained product. There is obtained a total of 256.5 parts (89% of theory) of colorless crystals of hydrazinium-di(beta-hydromuconate).

This salt is heated for three hours at 200° C. at autogenous pressure in a steel autoclave under nitrogen. The autoclave is allowed to cool to room temperature, opened, the semi-solid product removed, and treated with 200 parts of boiling methanol. The resulting suspension is cooled to about 10–15° C. and the solid removed by filtration. There is thus obtained 88 parts (38.6% of theory) of crude 1,1'-bis(5-oxo-2-pyrrolidineacetic acid).

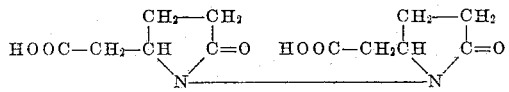

This crude product is purified by suspending in 250 parts of water and treating with 31.2 parts sodium carbonate. The resulting solution of disodium-1,1'-bis(5-oxo-2-pyrrolidineacetate) is neutralized with 58.3 parts of concentrated hydrochloric acid. The resulting suspension is chilled in an ice bath and the crystalline material removed by filtration. After evaporation of the filtrate and removal of the additional crystalline product formed by extracting with hot absolute ethanol and subsequent crystallization, there is obtained a total yield of 46.5 parts (20.4% of theory) of 1,1' - bis(5 - oxo - 2 - pyrrolidineacetic acid) of intermediate purity as slightly off-white crystals. This slightly impure material is dissolved in 500 parts of boiling water and the resulting solution treated with decolorizing charcoal and filtered. The filtrate is concentrated to approximately one-fifth of its original volume and then cooled in an ice bath. The resulting crystalline material is removed by filtration. Subsequent concentration and cooling of this filtrate yielded more crystalline material. There is obtained a total yield of 36.9 parts of relatively pure 1,1'-bis(5-oxo-2-pyrrolidineacetic acid). After recrystallization of this material from 560 parts of 95% alcohol, there is obtained 28.5 parts of pure 1,1'-bis(5-oxo-2-pyrrolidineacetic acid) as colorless crystals.

Anal. Calcd. for $C_{12}H_{16}O_6N_2$: Neutral equivalent 142.0 Found: Neutral equivalent 141.5, 142.9.

EXAMPLE II

*Preparation of 1,1'-ethylenebis(5-oxo-2-pyrrolidineacetic acid)*

To a nearly boiling solution of 91 parts of betahydromuconic acid in 640 parts of absolute ethanol is added with stirring and occasional cooling in an ice bath sufficient to prevent the ethanol from boiling, a cold (about 10° C.) solution of 27.5 parts of aqueous 69% ethylenediamine (equivalent to 19 parts of 100% ethylenediamine) in 100 parts of ethanol. The resulting slurry is chilled and the solid material removed by filtration. The filtrate is concentrated by distillation under reduced pressure and the resulting crystalline material removed by filtration and combined with the previously obtained product. There is thus obtained a total of 104.2 parts (94.8% of theory) of crystalline ethylenediammonium beta-hydromuconate.

One hundred (100) parts of this salt is placed in a glass-lined, steel autoclave under an atmosphere of nitrogen, the autoclave closed, and the contents heated under autogenous pressure for three hours at 190–200° C. After allowing the autoclave to cool to room temperature, the semi-solid product is removed with the aid of 35 parts of hot ethanol. The resulting slurry is filtered and the filter cake washed with 75 parts of ice cold methanol. After careful drying, there is obtained 32.8 parts (36.6% of theory) of almost white crystals of 1,1'-ethylenebis(5-oxo-2-pyrrolidineacetic acid). This product is twice recrystallized from water (using approximately 500 parts of water each time) to give 15.2 parts (21.8% of theory) of slightly off-white crystals of 1,1' - ethylenebis(5 - oxo - 2 - pyrrolidineacetic acid).

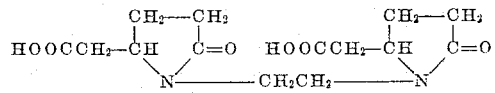

Anal. Calcd. for $C_{14}H_{20}O_6N_2$: C, 53.85%; H, 6.41%; N, 8.98%; N. E., 156. Found: C, 53.98%; H, 6.58%; N, 8.94%; N. E., 156.6.

Any diprimary diamine having its two primary amino groups directly bonded to each other or separated by a chain of carbons wholly aliphatic in nature, i. e., non-benzenoid, i. e., aliphatic and cycloaliphatic, may be used in preparing the products of this invention by the process of this invention. These diprimary diamines include hydrazine or any aliphatic or cycloaliphatic diprimary diamine. Specific examples, in addition to those given previously, are the aliphatic diprimary diamines, e. g., tetramethylenediamine, hexamethylenediamine, decamethylenediamine; cycloaliphatic diprimary diamines, e. g., 1,4-diaminocyclohexane, di - p - aminocyclohexylmethane; substituted aliphatic diprimary diamines, e. g., 3-methoxyhexamethylenediamine, 1,2-propylenediamine; substituted cycloaliphatic diprimary diamines, e. g., methylenebis(4-amino-3-methylcyclohexane). Preferred for reasons of lack of complicating factors in the reaction are the aliphatic diprimary diamines which apart from amino nitrogen and hydrogen thereon are hydrocarbon.

Specific acids other than that mentioned in the illustrative examples which are useful in this invention are 3-hexene-1,6-dioic acid, 2-hexene-1,6-dioic acid, 5-carbethoxy-4-pentenoic acid, 5-carbethoxy-3-pentenoic acid, 5-carbamyl-4-pentenoic acid, 5-carbamyl-3-pentenoic acid, 6-(N-butylamido)-3-hexenoic acid and 6-(N-methyl, N-propylamido)-2-hexenoic acid.

The monoesters can be prepared by the method of "Organic Syntheses—Collected Volume II," pages 276–277 as follows: one mole of the acid is dissolved in 38.5 parts of di-n-butyl ether containing 30 parts of concentrated hydrochloric acid. Approximately 0.6 mole of the diester of the same acid whose monoester is desired (the ester groups being the same) is added. The mixture is heated at 160–170° C. until homogeneous and then the temperature is lowered to 120–130° C. and one mole of the alcohol corresponding to the ester is added. The reaction mixture is refluxed for two hours and then fractionated to give the following products: (1) a mixture of the alcohol, water, and dibutyl ether; (2) the diester, and (3) the monoester.

The monoester can be converted to the monoamide or substituted monoamide by reacting the monoester with thionyl chloride to form the acid chloride of the monoester and subsequently reacting this compound with ammonia or the appropriate amine to form the monoester-monoamide or monoester - substituted - monoamide which upon alkaline hydrolysis followed by acidification produces the desired monoamide or substituted-monoamide.

It is not necessary that the ½ diprimary diamine/unsaturated acid salt be prepared directly and isolated. If desired, for convenience, or because of the shortened overall time of reaction, two molar proportions of the desired monoethylenically unsaturated carboxylic acid can be heated with one molar proportion of the required diprimary diamine at temperatures sufficiently high to produce directly the desired bis(5-oxo-2-pyrrolidineacetic acid) or derivative.

The process of this invention can be carried out in the range of 100-250° C. For reasons of increased yield it is preferred to carry out the reaction in the range of 150-250° C. but always below the decomposition point of the desired bis(5-oxo-2-pyrrolidineacetic acid) or derivative.

For reasons of lack of discoloration in the final product and for concomitant ease in purification it is preferred to carry out the process of this invention in a system protected from the atmosphere, i. e., a closed system under a positive pressure of nitrogen. For reasons of lack of discoloration and the lower quantity of impurities obtained, it is preferred to prepare the products of this invention in steel, glass, or glass-lined equipment, with the latter two especially preferred.

In the process of purification of the desired bis(5-oxo-2-pyrrolidineacetic acid) or derivative, it is preferred, since material of improved quality is obtained in better yields, to remove the reaction residue from the reaction vessel with an inert solvent, such as ethanol, methanol, acetone or dioxane and to dry the resultant solution or suspension prior to purification of the product.

The products of this invention are useful as intermediates for the preparation of other compounds. For example, the bis(5-oxo-2-pyrrolidineacetic acids) and their derivatives of this invention may be converted to the corresponding acid chlorides which may in turn be used to prepare other bis(oxo-pyrrolidine) derivatives. These acids may also be used as plant growth regulants. In addition, they serve as novel dibasic acids useful in the preparation of polyamides, polyesters and the like.

As many apparently widely different embodiments of this invention may be made without departing from the spirit and scope thereof, it is to be understood that this invention is not limited to the specific embodiments thereof except as defined in the appended claims.

I claim:

1. A process for obtaining pyrrolidine compounds which comprises heating at a temperature of from 100° C. to 250° C. one molar proportion of a diprimary diamine with two molar proportions of a monounsaturated carboxylic acid of the formula AR³COOH in which R³ consists of a chain of four carbon atoms containing as the only carbon-to-carbon unsaturation a single ethylenic double bond situated in one of the positions beta and gamma to the carboxyl group, said carbon atoms having their valences satisfied only by members selected from the group consisting of hydrogen and hydrocarbon radicals, and in which A is a group selected from the class consisting of carboxyl groups and neutral groups which upon hydrolysis is converted to a carboxyl group without the formation of additional acidic products.

2. The process set forth in claim 1 in which A is the carboxyl group.

3. The process set forth in claim 1 in which A is the carbamyl group.

4. The process set forth in claim 1 in which A is a carbalkoxy group.

5. A compound having the formula

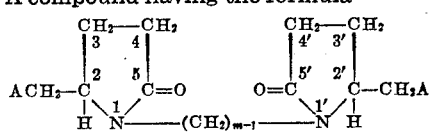

in which m is an integer of from 1 to 16 and A is a group selected from the class consisting of carboxyl groups and neutral groups which upon hydrolysis are converted to carboxyl groups without the formation of acidic products.

6. The compound defined in claim 5 in which A is the carboxyl group.

7. The compound defined in claim 5 in which A is the carbamyl group.

8. The compound defined in claim 5 in which A is a carbalkoxy group.

9. 1,1'-bis(5-oxo-2-pyrrolidineacetic acid).

10. 1,1'-ethylene-bis(5-oxo-2-pyrrolidineacetic acid).

11. The process set forth in claim 1 in which said diamine is an aliphatic diprimary diamine which, other than the amino groups, consists of saturated hydrocarbon.

12. The process set forth in claim 11 in which A is the carboxyl group.

13. The process set forth in claim 11 in which A is the carbamyl group.

14. The process set forth in claim 11 in which A is a carbalkoxy group.

15. A process for obtaining pyrrolidine compounds which comprises heating at a temperature of from 100° C. to 250° C. one molar proportion of a diprimary diamine with two molar proportions of beta-hydromuconic acid.

16. The process as set forth in claim 15 in which said diamine is an aliphatic diprimary diamine which, other than the amino groups, consists of saturated hydrocarbon.

GEORGE LYMAN EVANS.

REFERENCES CITED

The following references are of record in the file of this patent:

Willstatter and Hollander: Ber. Deut. Chem. Gesell., vol. 34, pp. 1818 and 1819 (1901).